United States Patent
Won et al.

(10) Patent No.: US 7,500,122 B2
(45) Date of Patent: Mar. 3, 2009

(54) EFFICIENCY OPTIMIZATION METHOD FOR HARDWARE DEVICES WITH ADJUSTABLE CLOCK FREQUENCIES

(75) Inventors: Ming-Ting Won, Taipei (TW); Fu-Shun Wu, Jhonghe (TW); Po-Jen Cheng, Kaohsiung (TW)

(73) Assignee: Micro-Star Int'l Co., Ltd., Taipei (TW)

( * ) Notice: Subject to any disclaimer, the term of this patent is extended or adjusted under 35 U.S.C. 154(b) by 416 days.

(21) Appl. No.: 11/335,534

(22) Filed: Jan. 20, 2006

(65) Prior Publication Data

US 2007/0174650 A1    Jul. 26, 2007

(51) Int. Cl.
*G06F 1/26* (2006.01)
(52) U.S. Cl. ................................ 713/320; 713/322
(58) Field of Classification Search ............ 713/300, 713/320, 322, 323, 500
See application file for complete search history.

(56) References Cited

U.S. PATENT DOCUMENTS

| 6,574,739 B1 * | 6/2003 | Kung et al. ............... 713/322 |
| 6,574,740 B1 * | 6/2003 | Odaohhara et al. ....... 713/323 |
| 7,111,178 B2 * | 9/2006 | Rusu et al. ............... 713/300 |
| 7,343,505 B2 * | 3/2008 | Chotoku et al. .......... 713/340 |

FOREIGN PATENT DOCUMENTS

TW    485281    5/2002

\* cited by examiner

*Primary Examiner*—Chun Cao
(74) *Attorney, Agent, or Firm*—Rabin & Berdo, P.C.

(57) ABSTRACT

An efficiency optimization method for hardware devices with adjustable clock frequencies is provided. The work current of the hardware device is measured and used to obtain the corresponding work level from a conversion table. The obtained work level is compared with the currently executing work level to make adjustments for various parameters for the hardware device and for the operation of the corresponding heat-dissipating device. Therefore, the hardware device can achieve a better performance.

20 Claims, 12 Drawing Sheets

EFFICIENCY OPTIMIZATION METHOD FOR HARDWARE DEVICES WITH ADJUSTABLE CLOCK FREQUENCIES

BACKGROUND

1. Field of Invention

The invention relates to a frequency modulation method and, in particular, to an efficiency optimization method for a hardware device with an adjustable clock frequency.

2. Related Art

With rapid technological development, people rely heavily on the use of information processing devices. For convenience and increasing work efficiency, governments, enterprises, family and individuals are using information processing systems with high clock frequencies.

A most common method currently used to enhance the efficiency of information processing systems is to increase or decrease the clock frequencies of computer peripherals. Take the display card as an example, it has a graphic processing unit (GPU) specifically designed for processing two-dimensional (2D) and three-dimensional (3D) images. It uses clock signals to synchronize command execution and memory access. Therefore, it is possible to increase the performance of the display card by manually increasing the frequency of these clock signals.

Most of the conventional methods for adjusting the clock frequency of the display card, so-called overclocking or underclocking, are achieved manually by the user. In other words, the overclocking of the display card is usually done manually by the user to the core frequency and buffer frequency using application software. The adjustment in the core frequency is to overclock/underclock the core of the GPU. It is similar to the overclocking/underclocking of the internal frequency of the central processing unit (CPU). The adjustment in the buffer frequency is to increase/decrease the access speed of the graphic buffer to reduce the bottleneck effect in memory. That is similar to adjusting the external frequency of the motherboard for larger memory bandwidths.

For example, when processing only two-dimensional (2D) images and normal operations, such as internet surfing and hard drive (HD) defragmentation, the GPU remains its original speed, maintaining the normal use of the computer. When executing processes that use a lot of GPU resources, such as three-dimensional (3D) games or image processing, the GPU and memory clock frequencies can be increased by a particular ratio for the computer to process these actions.

However, before manually adjusting the clock frequency each time, the user has to refer to the reference manual and check the settings of other related peripherals in order to correctly make frequency adjustments. This does not only involve complicated steps, it is also possible to make incorrect adjustments due to the limited knowledge of the user. When the frequency adjustment is inappropriate or insufficient, it often results in additional loads in the operations of the system and thus unnecessary wastes in the hardware devices. Moreover, after manually overclocking the system, the display card is then operating in this state before any further adjustment is made. This does not only consume more electric power, the lifetime of the display card may be shortened too.

Therefore, how to use existing computer software technology to provide a means to automatically adjust the operation parameters of hardware devices in real time for better performance is an important direction of the field. Not only can such a means avoid user interventions that may result in device wearing, it may keep the computer peripherals often operating in an optimized state for higher performance.

SUMMARY

In view of the foregoing, an object of the invention is to provide an efficiency optimization method for hardware devices with adjustable clock frequencies. This is to solve the problem that the operation parameters of hardware devices cannot be automatically adjusted in the prior art.

To achieve the above object, the disclosed method involves the steps of: detecting the work current of the hardware device; obtaining a work level corresponding to the measured work current from a conversion table; comparing the obtained work level with the current work level; executing a first adjustment when the obtained work level is higher than the current work level; and executing a second adjustment when the obtained work level is lower than the current work level.

The first adjustment includes the steps of: adjusting the work voltage of the hardware device in accordance with the obtained work level and the conversion table; and adjusting the clock frequency of the hardware device in accordance with the obtained work level and the conversion table. The second adjustment includes the steps of: adjusting the clock frequency of the hardware device in accordance with the obtained work level and the conversion table; and adjusting the work voltage of the hardware device in accordance with the obtained work level and the conversion table. In addition, in the first adjustment, the operation of the heat-dissipating device corresponding to the hardware device is adjusted in accordance with the obtained work level and the conversion table before adjusting the work voltage. In the second adjustment, the operation of the heat-dissipating device corresponding to the hardware device is adjusted in accordance with the obtained work level and the conversion table after adjusting the work voltage.

By repeatedly and dynamically check and adjust various parameters, the hardware device can be maintained at better performance.

Moreover, the conversion table can be built in advance according to practical situations. The conversion table stores at least several work levels and their corresponding work currents, work voltages, work frequencies, and heat-dissipating device operations.

Furthermore, the initial current work level can be predetermined. After each adjustment, the current work level is updated. When the system is turned on or rebooted, the current work level can be set back to the initial work level by initialization. Afterwards, checks and adjustments can be performed at fixed time intervals, so that the hardware device can be maintained at better performance by the invention.

When the obtained work level is not the current work level, the obtained work level is recorded and a timer starts counting time. The system then repeatedly detects the work current of the hardware device, obtains the work level from the conversion table in accordance with the obtained work current, and confirms whether the obtained work level is the same as the previously obtained work level. When the currently obtained work level is the same as the previously obtained work level, the system further checks whether the timer has reached a predetermined time. The adjustment starts when the predetermined time is reached. When the work level obtained within this specific time changes, then the adjustment is not performed.

The adjustment is performed in an asymptotic way. That is, when the obtained work level is higher than the current work level, the first adjustment is performed. In accordance with the current work level and the conversion table, the work voltage of the hardware device is increased by one level, followed by raising the clock frequency of the hardware device by one level. On the other hand, if the obtained work level is lower than the current work level, the second adjustment is performed. The clock frequency of the hardware device is lowered by one level in accordance with the current work level and the conversion table, followed by lowering the work voltage by one level. Moreover, in the first adjustment, the operation of the heat-dissipating device corresponding to the hardware device is increased by one level in accordance with the current work level and the conversion table before adjusting the work voltage. Likewise, in the second adjustment, the operation of the heat-dissipating device corresponding to the hardware device is lowered by one level in accordance with the current work level and the conversion table after adjusting the work voltage, so as to maintain the heat-dissipating effect of the hard device.

In summary, the invention can be implemented to adjust various parameters and/or the operation of the corresponding heat-dissipating device (e.g., fan) through the terminate and stay resident program (TSR), firmware, or any other means on a hardware device with an adjustable clock frequency (e.g., processor, memory, etc). This can render a more efficient operation and avoid unnecessary power consumption, achieving better device performance. Here the processor can be a graphic processing unit (GPU) or a central processing unit (CPU).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION

The primary idea of the invention is to utilize computer software to provide an automatic adjusting method for optimized efficiency in the clock frequency of a computer peripheral. The invention is applicable to any hardware device with an adjustable clock frequency. The invention can be generally implemented to adjust various parameters and/or the operation of the corresponding heat-dissipating device (e.g., fan) through the terminate and stay resident program (TSR), firmware, or any other means on a hardware device with an adjustable clock frequency (e.g., processor, memory, etc), achieving better device performance. Here the processor can be a GPU or a CPU.

Figure 1:
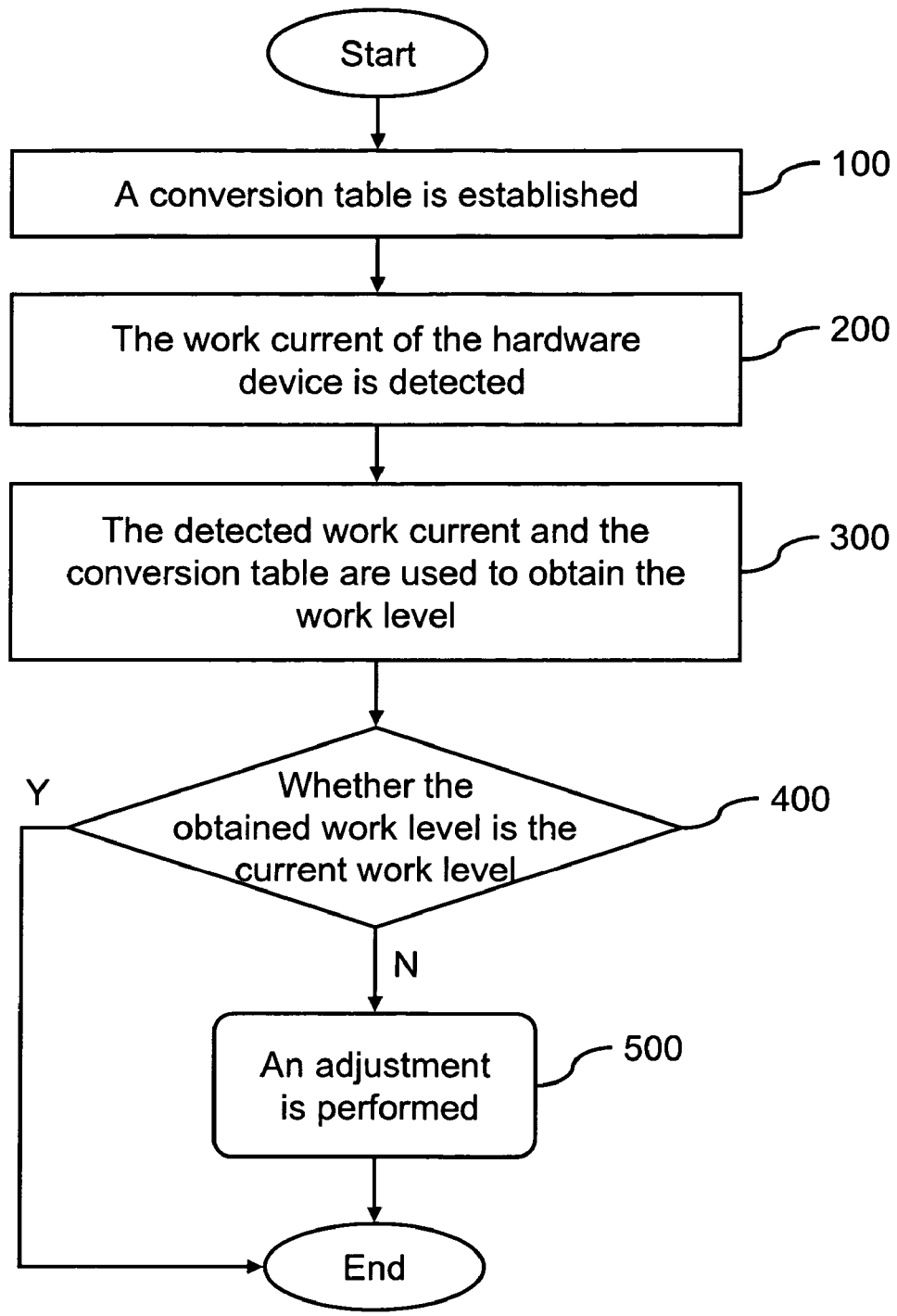
FIG. 1 is a flowchart of the efficiency optimization method for a hardware device with an adjustable clock frequency according to the first embodiment of the invention.

An explicit embodiment along with accompanying drawings is provided herein to explain the contents of the invention. FIG. 1 shows the procedures of optimizing the efficiency of a hardware device with an adjustable clock frequency.

A conversion table is established in advance (step 100), so that the disclosed computer software performed adjustments according to the conversion table. This conversion table is used to store the correspondence relations of the work levels, work currents, work voltages, clock frequencies, and operations of the heat-dissipating devices. Normally, these relations vary for different hardware devices and their specifications. Even though only one conversion table is used in this embodiment to record the correspondence relations among various parameters (work levels, work currents, work voltages, clock frequencies, and operations of the heat-dissipating devices), there may be actually several conversion tables in practice.

Afterwards, the work current of the hardware device is detected (step 200). The detected work current and the conversion table are used to obtain the work level (step 300). The system then checks whether the obtained work level is the current work level (step 400). If the obtained work level is not the same as the current work level, then an adjustment is performed (step 500). If the obtained work level is the same as the current work level, no adjustment is made.

The adjustment in step 500 lowers or raises the level of each state in accordance with whether the obtained work level is higher or lower than the current work level.

Figure 2A:
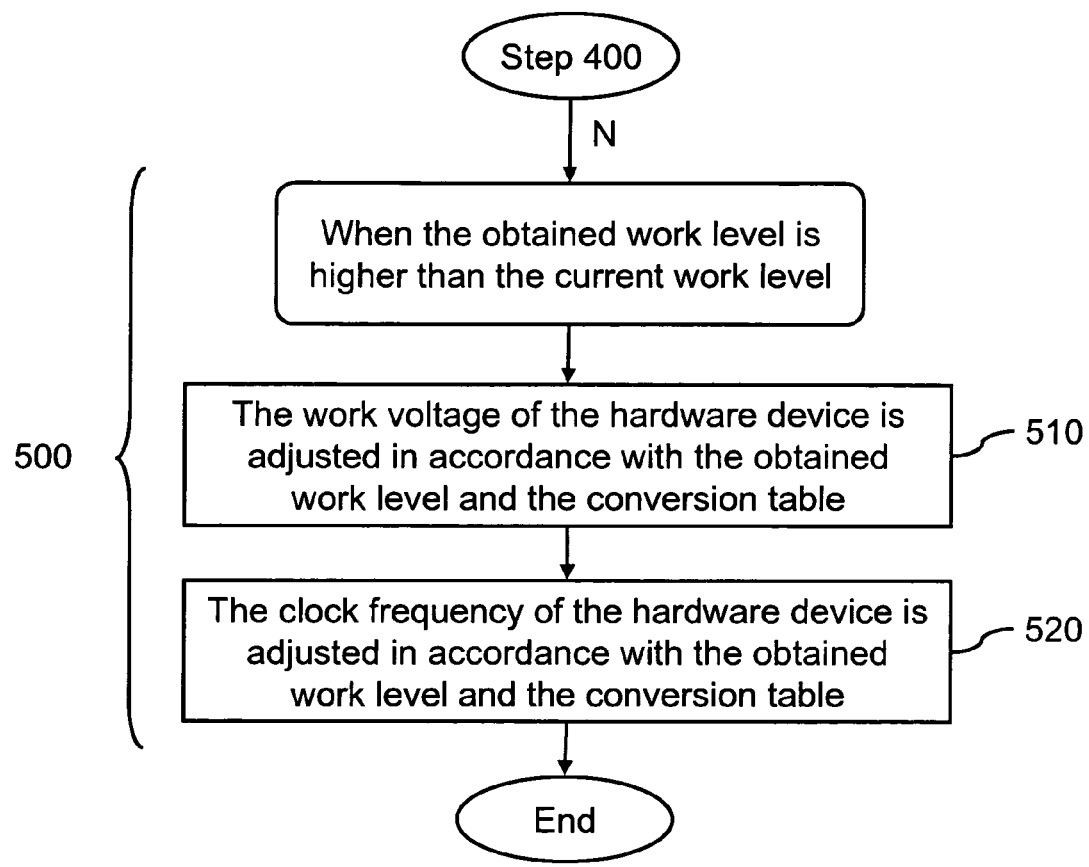
FIGS. 2A and 2B are flowcharts showing one embodiment of an adjustment in the disclosed efficiency optimization method.
Figure 2B:
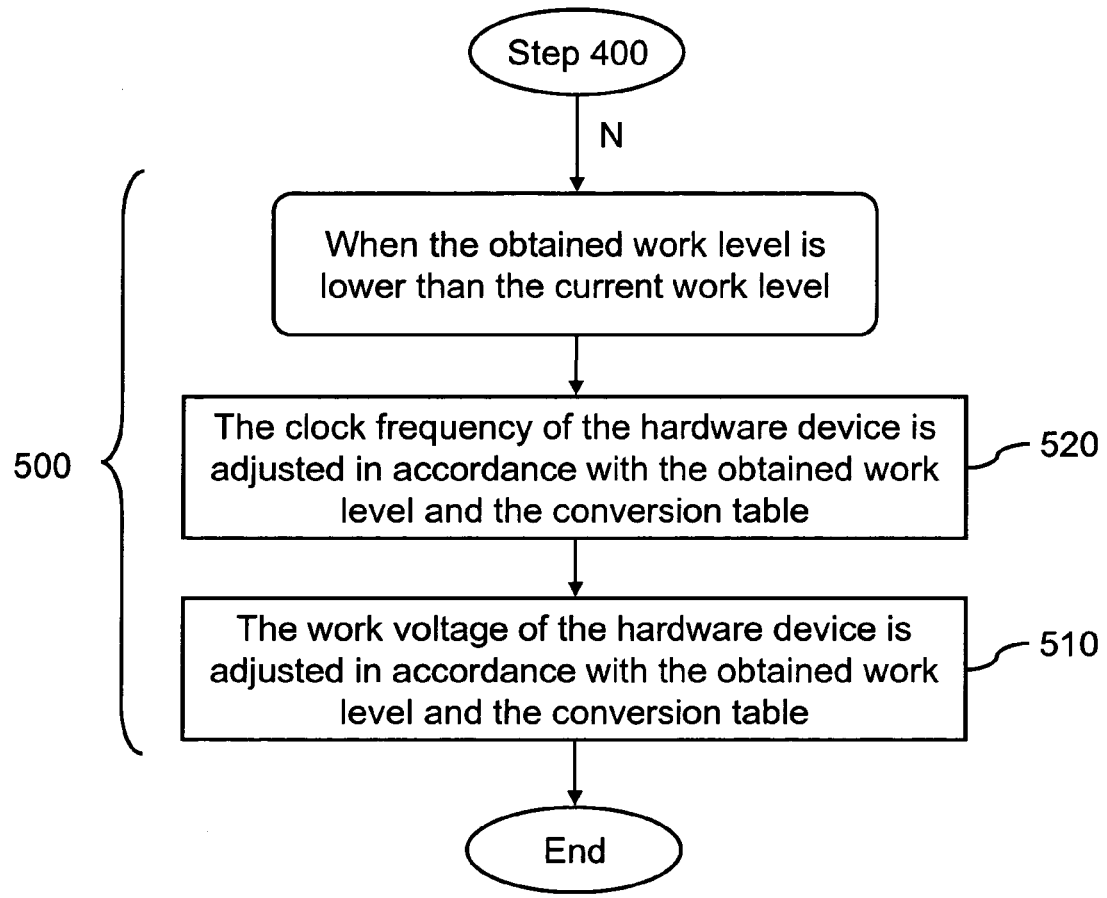

Therefore, the adjustments can be separated into a first adjustment and a second adjustment. With reference to FIG. 2A, the first adjustment is made in the situation when the obtained work level is higher than the current work level. It first adjusts the work voltage of the hardware device in accordance with the obtained work level and the conversion table (step 510). Finally, the clock frequency of the hardware device is adjusted in accordance with the obtained work level and the conversion table (step 520). The second adjustment is made in the situation when the obtained work level is lower than the current work level. It first adjusts the clock frequency of the hardware device in accordance with the obtained work level and the conversion table (step 520). Then, the work voltage of the hardware device is adjusted in accordance with the obtained work level and the conversion table (step 510), as shown in FIG. 2B.

Figure 3A:
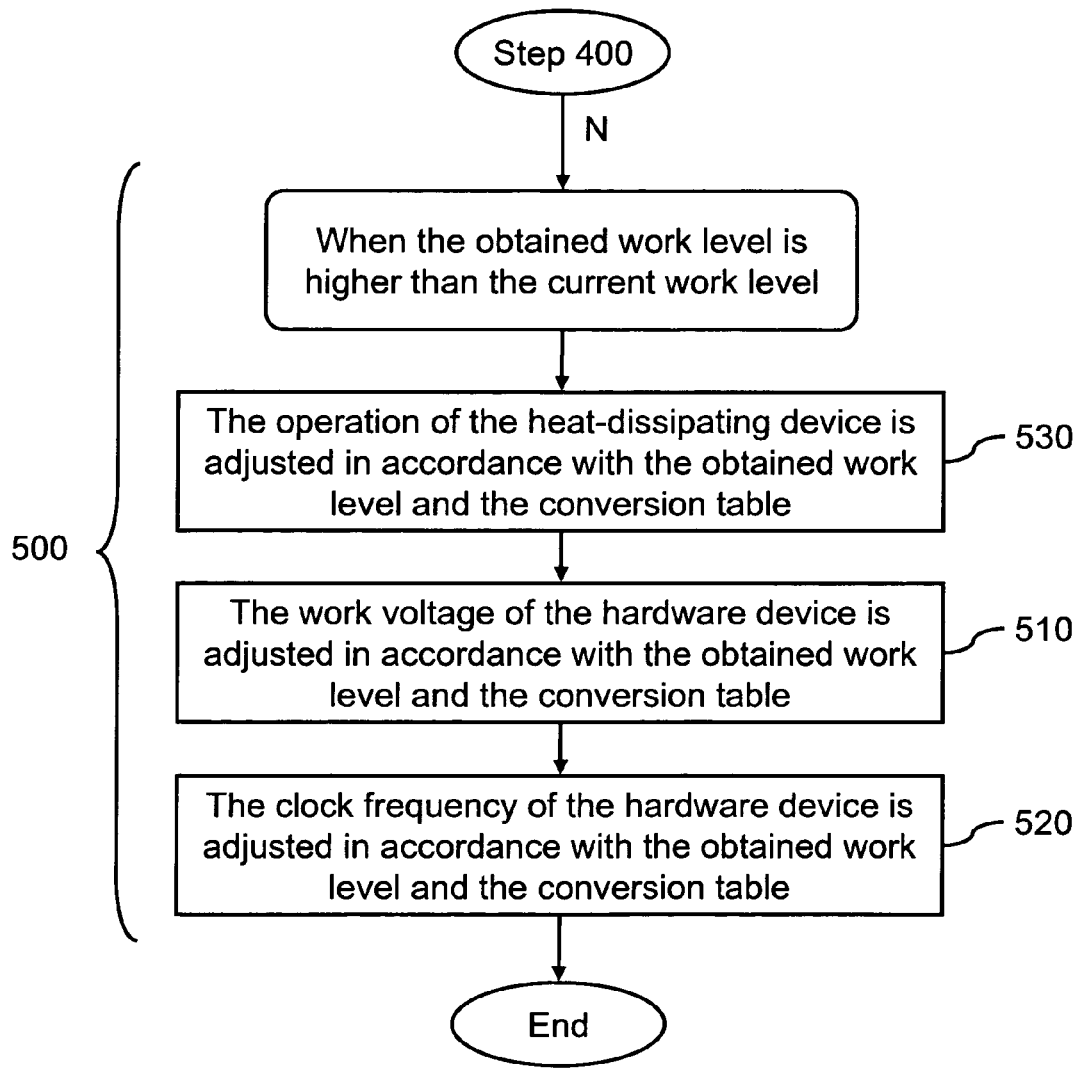
FIGS. 3A and 3B are flowcharts showing another embodiment of an adjustment in the disclosed efficiency optimization method.
Figure 3B:
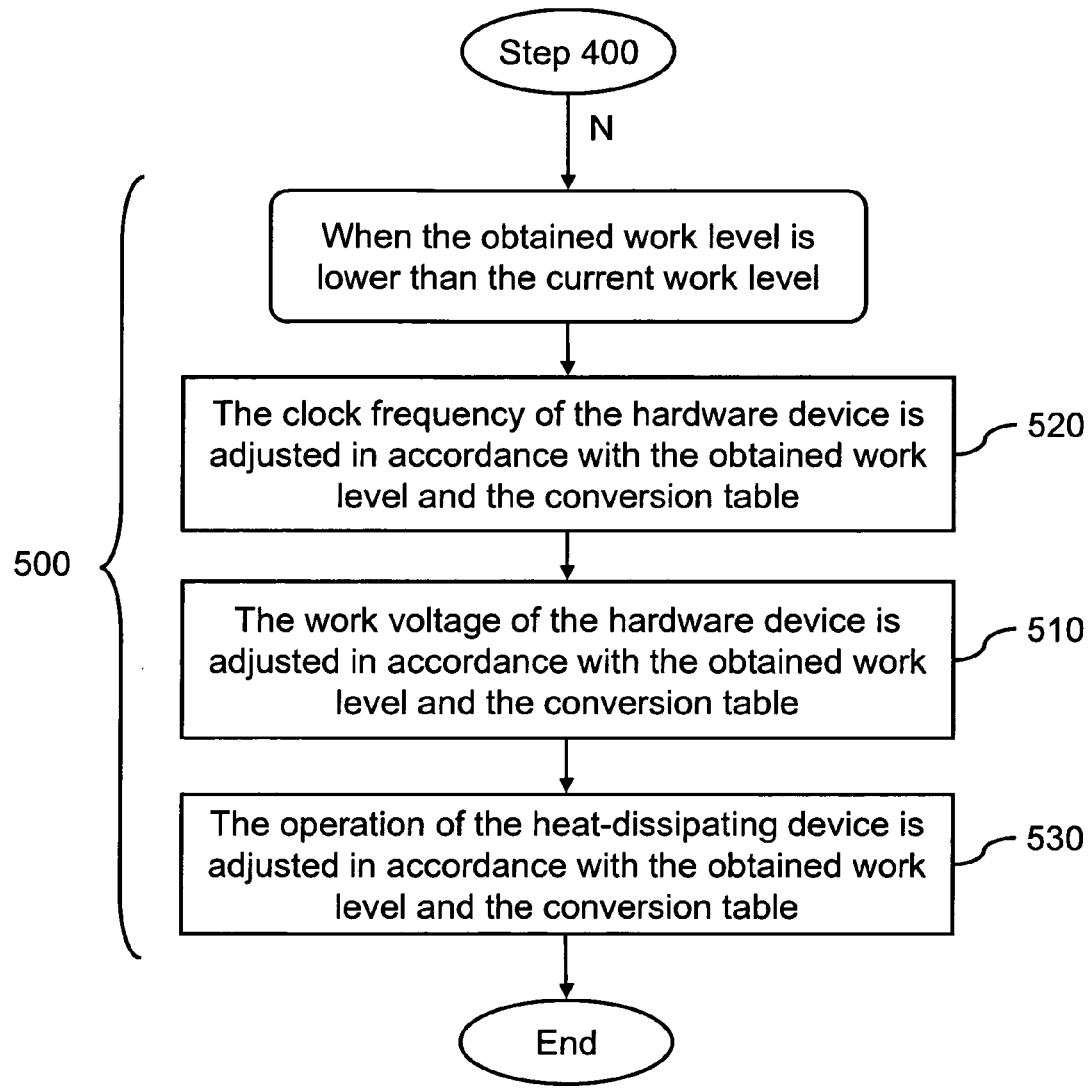

Since most hardware devices produce a lot of heat during their operations, a heat-dissipating device is often employed to help removing the heat. The invention also adjusts the operation of the heat-dissipating device for the hardware device. That is, when the obtained work level is higher than the current work level, the first adjustment adjusts the operation of the heat-dissipating device in accordance with the obtained work level and the conversion table (step 530), followed by adjusting the work voltage of the hardware device (step 510). Finally, the clock frequency of the hardware device is adjusted in accordance with the obtained work level and the conversion table (step 520), as shown in FIG. 3A. When the obtained work level is lower than the current work level, the second adjustment adjusts the clock frequency of the hardware device in accordance with the obtained work level and the conversion table (step 520), followed by adjusting the work voltage of the hardware device (step 510). Afterwards, the operation of the heat-dissipating device is adjusted in accordance with the obtained work level and the conversion table (step 530), as shown in FIG. 3B.

Figure 4:
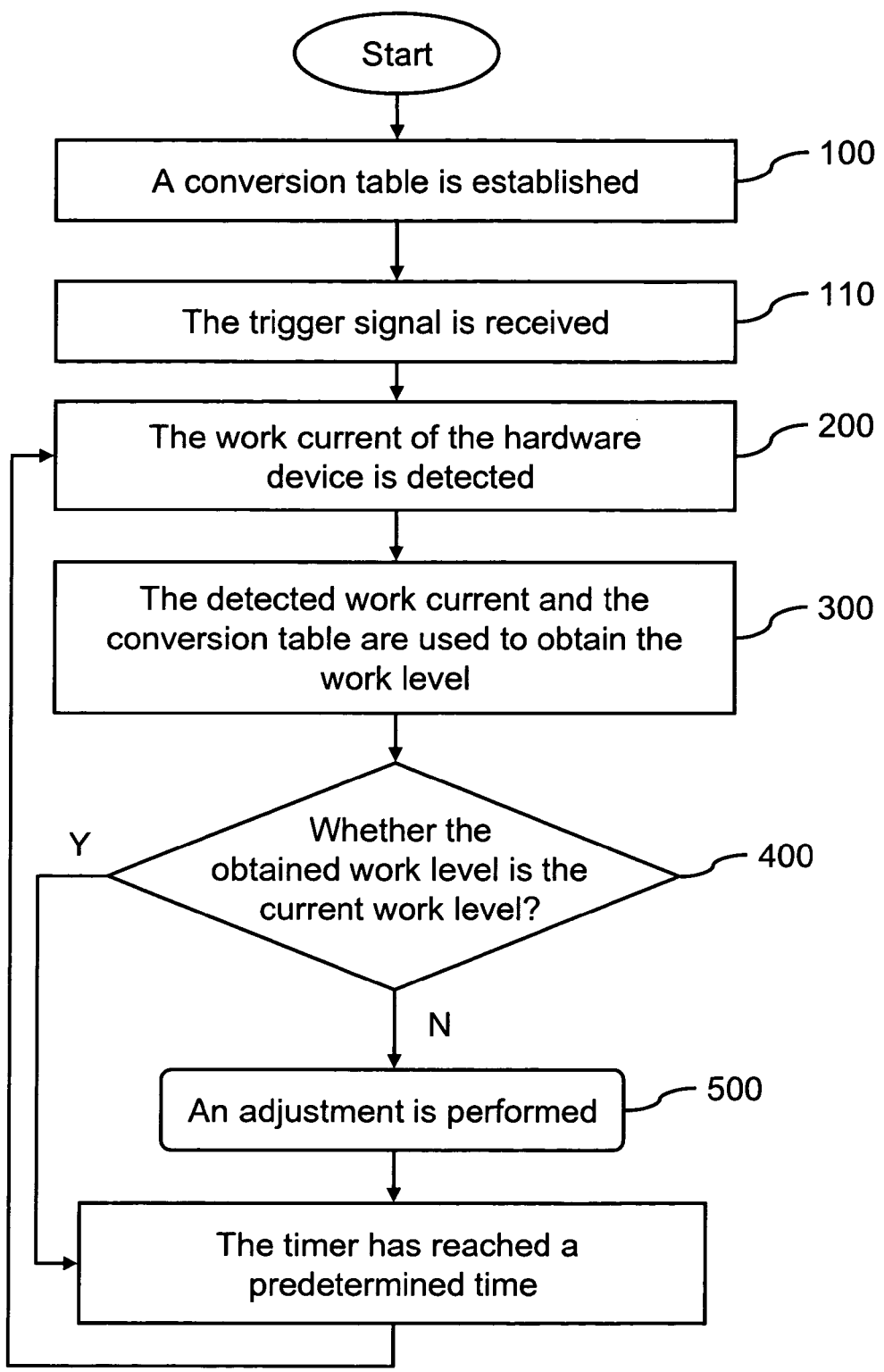
FIG. 4 is a flowchart showing the efficiency optimization method for a hardware device with an adjustable clock frequency according to the second embodiment of the invention.

Therefore, the hardware device can be maintained at better performance by repeatedly and dynamically checking and adjusting various parameters thereof. In practice, steps 200, 300, 400, and/or 500 can be executed once every fixed time to keep the hardware device in better efficiency. An initialization function can be provided so that the user can enter a trigger signal to start the repetition of steps 200, 300, 400, and/or 500. To put in a simple way, the repetition of steps 200, 300, 400, and/or 500 is started only when the trigger signal is received (step 110), as shown in FIG. 4.

Figure 5A:
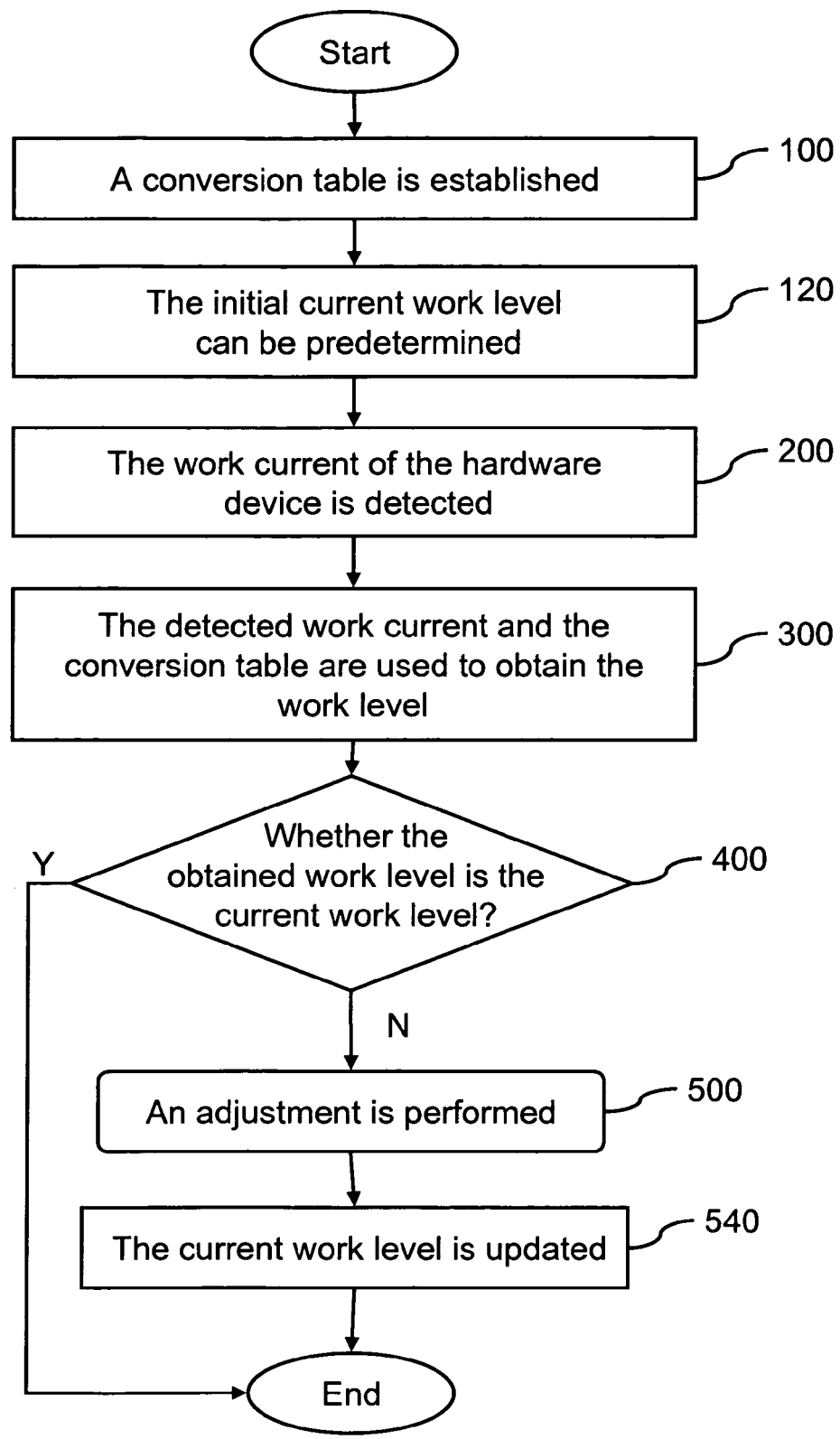
FIG. 5A is a flowchart showing the efficiency optimization method for a hardware device with an adjustable clock frequency according to the third embodiment of the invention.
Figure 5B:
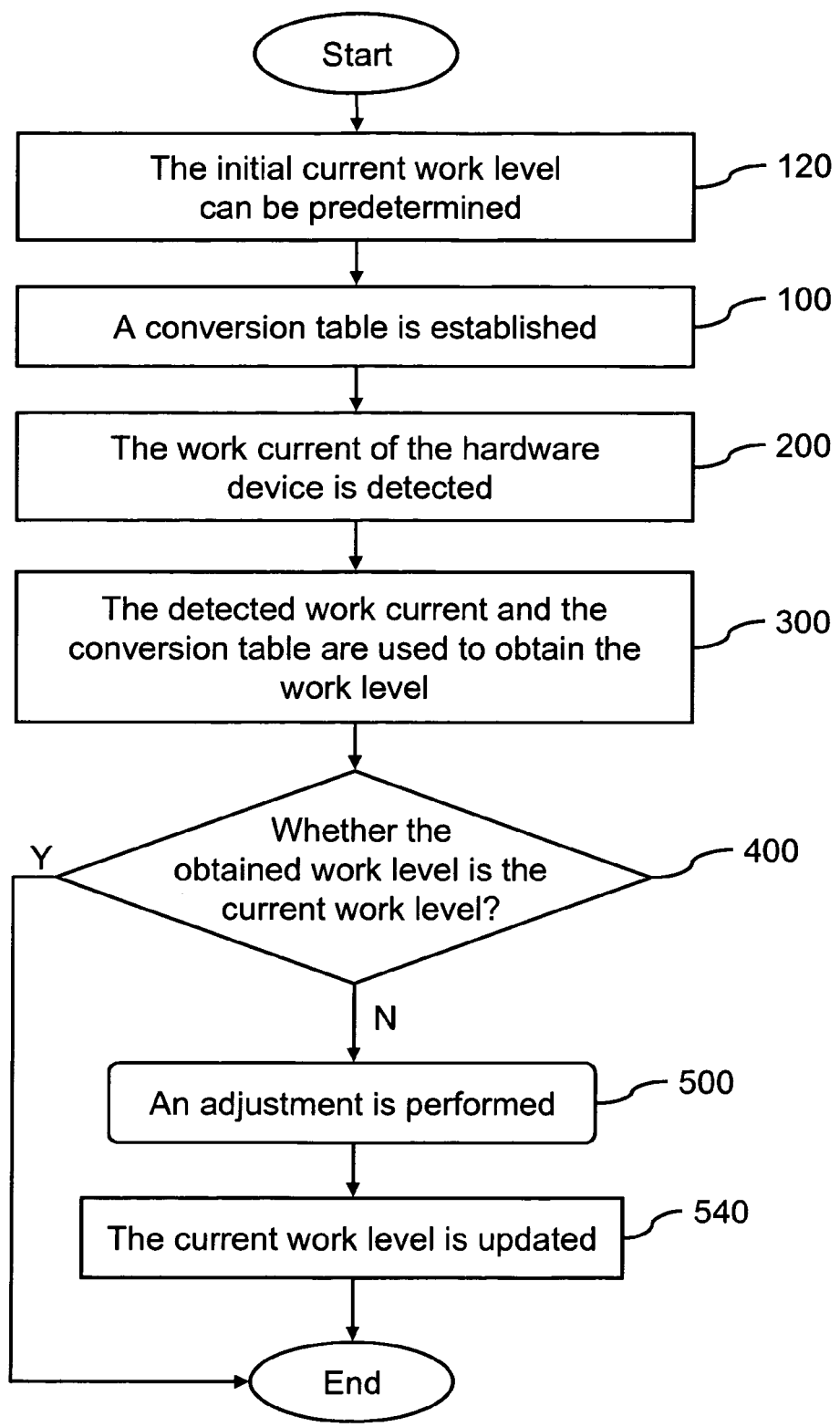
FIG. 5B is a flowchart showing the efficiency optimization method for a hardware device with an adjustable clock frequency according to the fourth embodiment of the invention.
Figure 6:
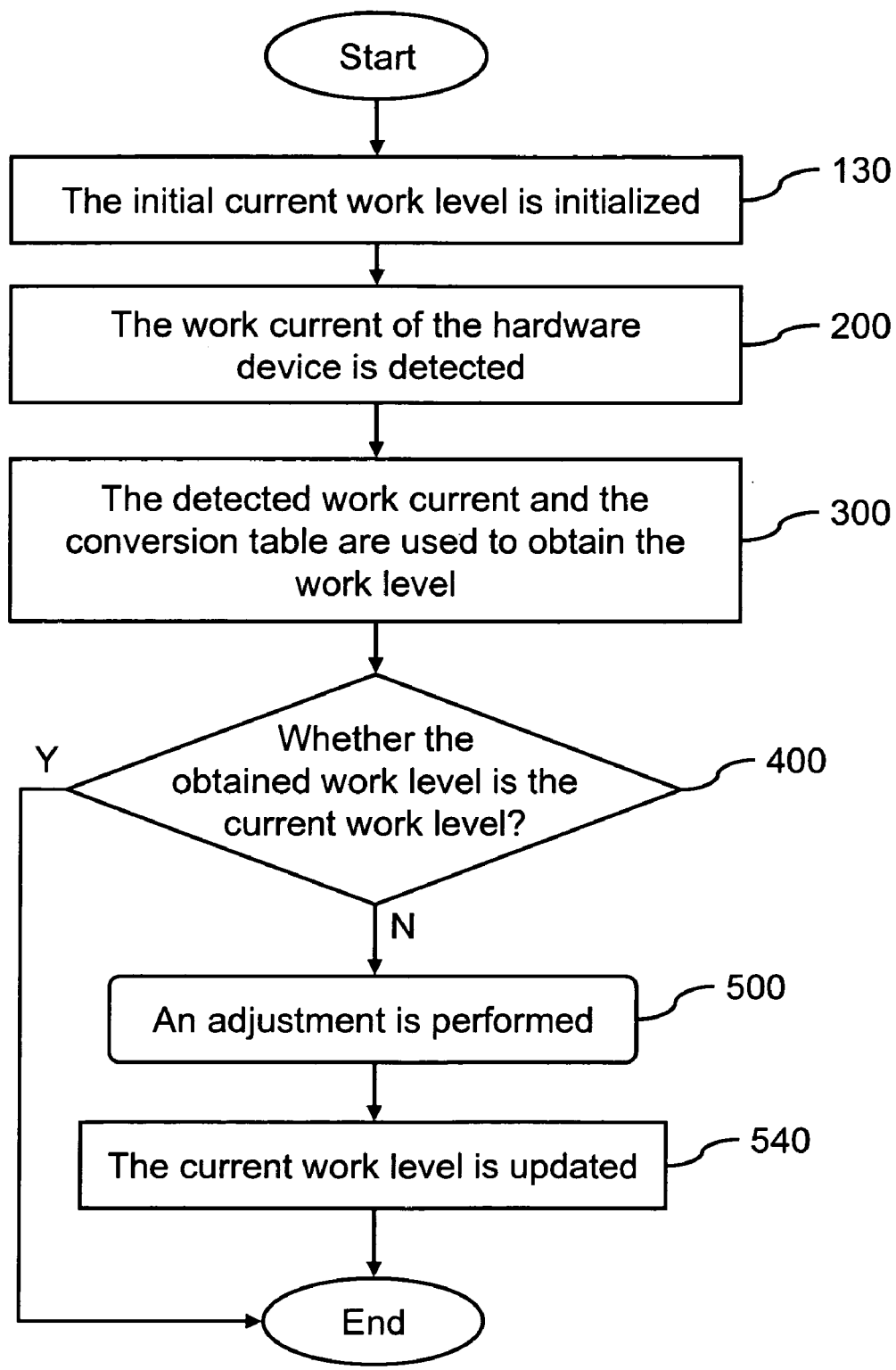
FIG. 6 is a flowchart showing the efficiency optimization method for a hardware device with an adjustable clock frequency according to the fifth embodiment of the invention.

Besides, the initial current work level can be predetermined (step 120) and updated the current work level each time when an adjustment is executed (step 540), as shown in FIGS. 5A and 5B. Moreover, when the system is turned on or rebooted, the initial current work level can be restored through initialization (step 130). Afterwards, steps 200, 300, 400, and/or 500 can be executed repeatedly at a fixed time interval, so that the hardware device is kept at better efficiency, as shown in FIG. 6.

Figure 7:
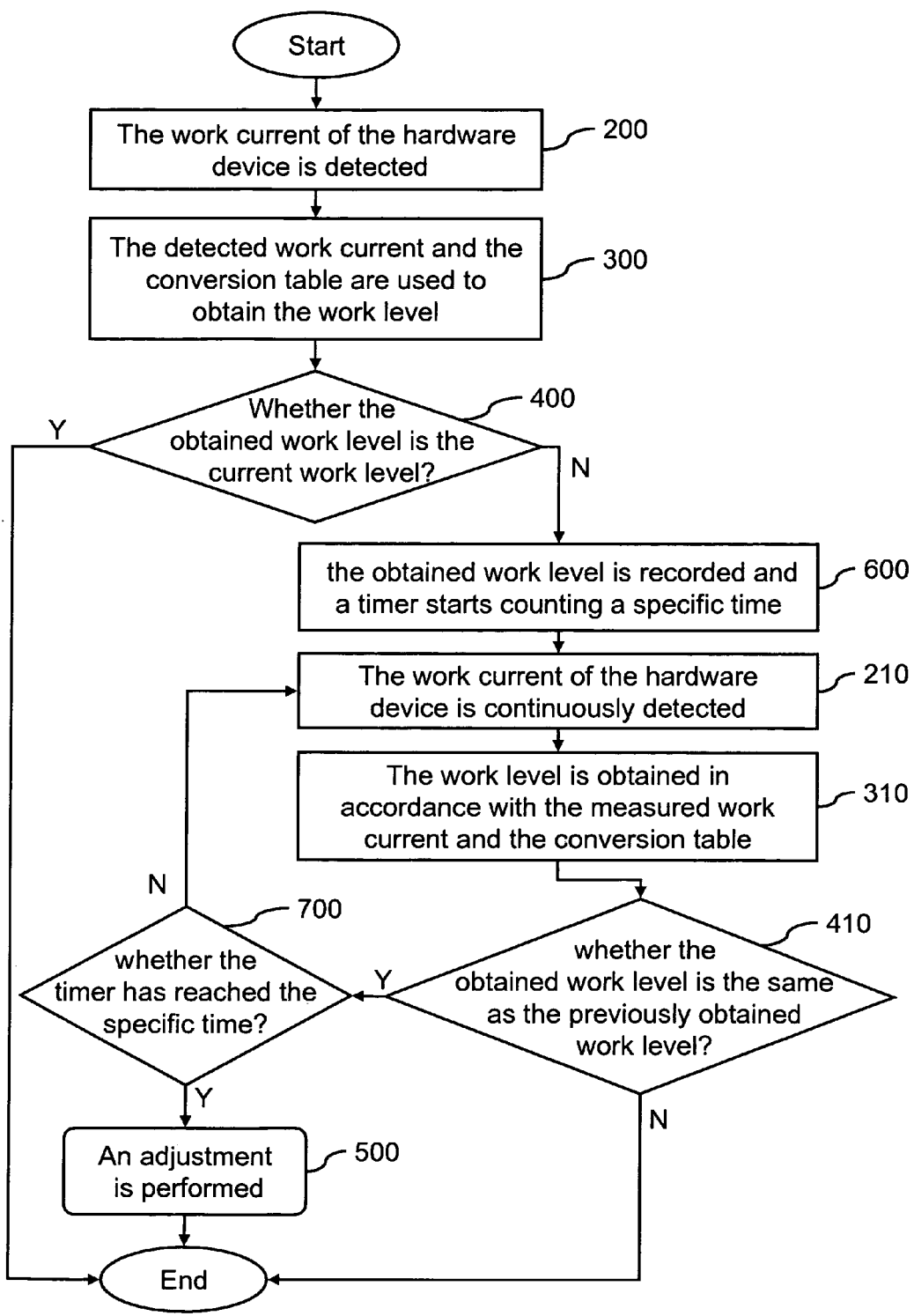
FIG. 7 is a flowchart of the efficiency optimization method in FIG. 6.

When the obtained work level is not the same as the current work level, the obtained work level is recorded and a timer starts counting a specific time (step 600). The work current of the hardware device is continuously detected (step 210). The work level is obtained in accordance with the measured work current and the conversion table (step 310) The system then checks whether the obtained work level is the same as the previously obtained work level (step 410). When the work level is the same as the previously obtained work level, the system checks whether the timer has reached the specific time (step 700) and the adjustment starts after the specific time is reached. When the work level changes within the specific time, no adjustment is made, as shown in FIG. 7. This avoids frequent adjustments.

For example, applying the invention to the display card can adjust the efficiency of the GPU and/or memory. For the convenience of explanation, the work levels are divided into the idle state, the normal state, and the 3D state. The conversion table established in advance is stored with the work levels, work currents, work voltages, clock frequencies, and operations of the heat-dissipating devices corresponding to the three work levels. Besides, if the initial current work level is the normal state, then the user is in the normal operation environment (e.g., internet surfing, word processing, or video playing). If within the specific time the work level is in the idle state after the work current detection, meaning that the user environment is idle for a period (e.g. in the state of running a screen saver), then the corresponding clock frequency in the conversion table is used to lower the clock frequency of the GPU and/or the memory. Afterwards, the work voltage corresponding to the idle state in the conversion table is used to lower the work voltage of the GPU and/or the memory. Finally, the operation of the heat-dissipating device corresponding to the idle state in the conversion table is used to lower the rotating speed of the fan. On the other hand, if the work level is in the 3D state within the specific time after the work current detection, meaning that the user environment is in the 3D state for a period (e.g., in the state of running some 3D game or image processing), then the operation of the heat-dissipating device corresponding to the 3D state in the conversion table is used to increase the rotating speed of the fan. Afterwards, the work voltage corresponding to the 3D state in the conversion table is used to increase the voltage of the GPU and/or the memory. Finally, the clock frequency corresponding to the 3D state in the conversion table is used to increase the clock frequency of the GPU and/or the memory. Therefore, the GPU and/or the memory can be dynamically adjusted in accordance with the user environment, avoiding additional power consumption and achieving better efficiency. The display card thus has better efficiency.

Figure 8A:
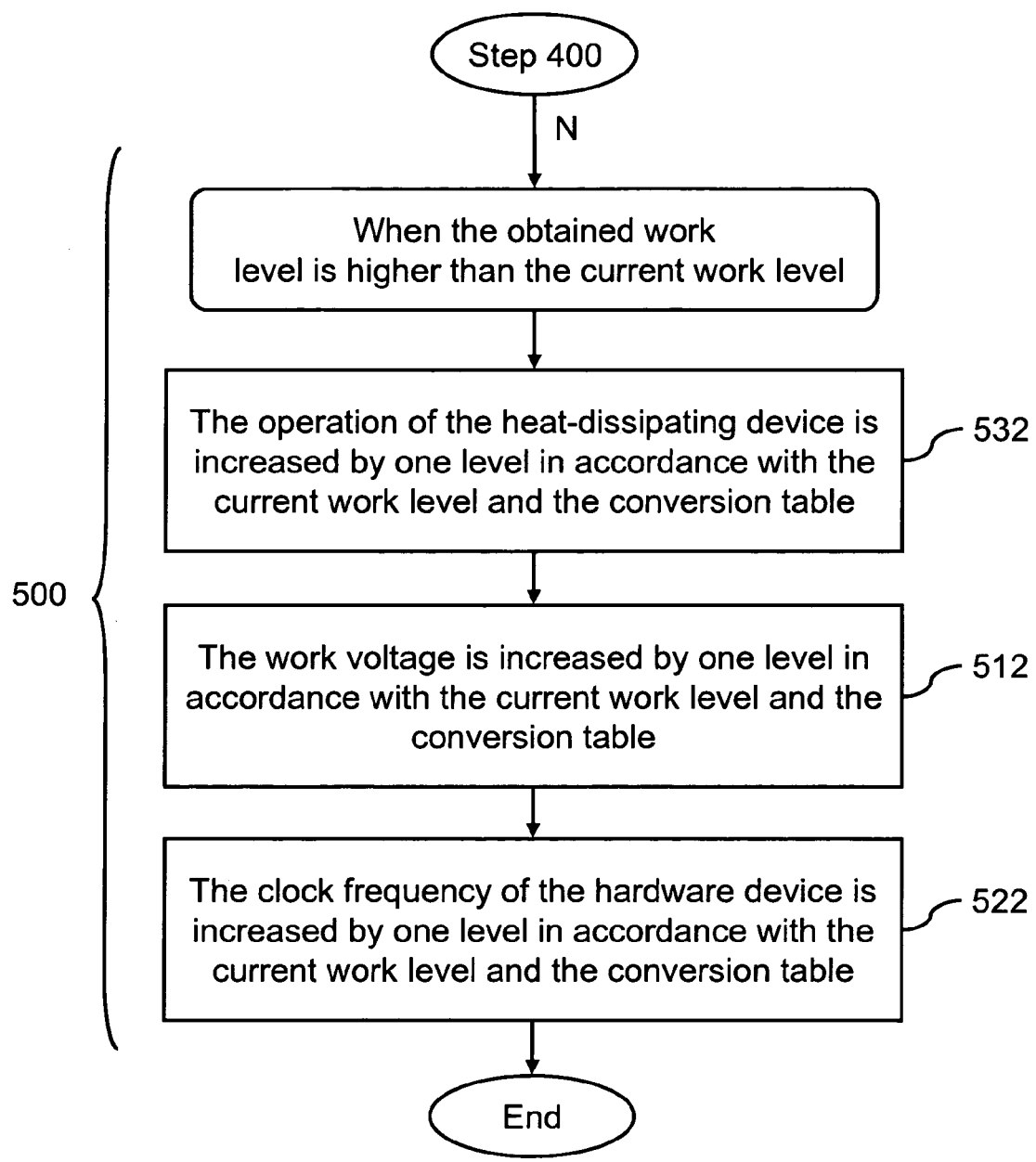
FIGS. 8A and 8B are flowcharts of yet another embodiment of the disclosed efficiency optimization method.
Figure 8B:
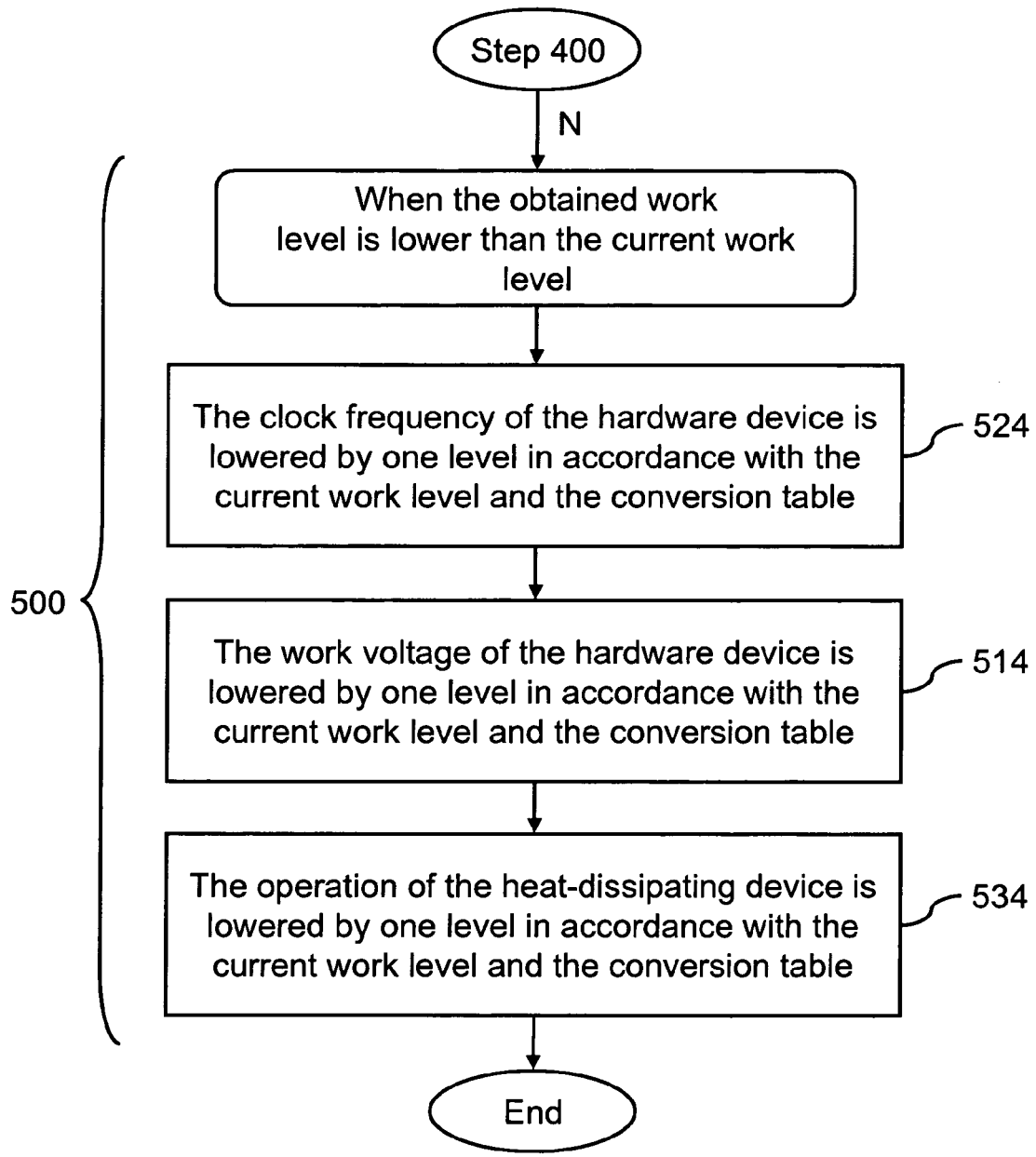

Even though this embodiment uses the example of only three work levels, there may be two, four, five, or even more work levels in practice. The adjustment in step 500 can be gradually progressed. That is, when the obtained work level is higher than the current work level, the first adjustment first increases the operation of the heat-dissipating device by one level in accordance with the current work level and the conversion table (step 532). Afterwards, the work voltage is increased by one level in accordance with the current work level and the conversion table (step 512). Finally, the clock frequency of the hardware device is increased by one level in accordance with the current work level and the conversion table (step 522), as shown in FIG. 8A. Likewise, when the obtained work level is lower than the current work level, the clock frequency of the hardware device is lowered by one level in accordance with the current work level and the conversion table (step 524). Afterwards, the work voltage of the hardware device is lowered by one level in accordance with the current work level and the conversion table (step 514). Finally, the operation of the heat-dissipating device is lowered by one level in accordance with the current work level and the conversion table (step 534), as shown in FIG. 8B.

For example, applying the invention to the display card can adjust the efficiency of the GPU and/or memory. For the convenience of explanation, the work levels are divided into a first state, a second state, a third state, a fourth state, and a fifth state. The conversion table established in advance is stored with the work levels, work currents, work voltages, clock frequencies, and operations of the heat-dissipating devices corresponding to the five work levels. Suppose the initial current work level is the third state. If within the specific time the work level is in the first state after the work current detection, then the clock frequency corresponding to the work level lower than the third state (i.e., the second state) in the conversion table is used to lower the clock frequency of the GPU and/or the memory. Afterwards, the work voltage corresponding to the work level lower than the third state (i.e., the second state) in the conversion table is used to lower the work voltage of the GPU and/or the memory. Finally, the operation of the heat-dissipating device corresponding to the work level lower than the third state (i.e., the second state) in the conversion table is used to lower the rotating speed of the fan. On the other hand, if the work level is in the fifth state within the specific time after the work current detection, then the operation of the heat-dissipating device corresponding to the work level higher than the work level of the third state (i.e., the fourth state) in the conversion table is used to increase the rotating speed of the fan. Afterwards, the work voltage corresponding to the work level higher than the work level of the third state (i.e., the fourth state) in the conversion table is used to increase the voltage of the GPU and/or the memory. Finally, the clock frequency corresponding to the work level higher than the work level of the third state (i.e., the fourth state) in the conversion table is used to increase the clock frequency of the GPU and/or the memory. Therefore, the GPU and/or the memory can be dynamically adjusted in accordance with the user environment, avoiding additional power consumption and achieving better efficiency. The display card thus has better efficiency.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An efficiency optimization method for a hardware device with an adjustable clock frequency, comprising the steps of:
   providing at least a conversion table recording a plurality of correspondence relations among a plurality of work levels, a plurality of work currents, a plurality of work voltages, a plurality of clock frequencies;
   detecting a work current of a hardware device;
   obtaining a work levels, corresponding to the detected work current, of the plurality of work levels recorded in the conversion table;
   comparing the obtained work level with a current work level;
   executing an adjustment when the obtained work level differs from the current work level, the adjustment including the steps of:
      adjusting a current work voltage of the detected hardware device to one, corresponding to the obtained work level, of the plurality of work voltages recorded in the conversion table; and
      adjusting a current clock frequency of the detected hardware device to one corresponding to the obtained work level, of the plurality of clock frequency recorded in the conversion table.

2. The efficiency optimization method of claim 1, wherein the at least a conversion table records the plurality of correspondence relations among the plurality of work levels, the plurality of work currents, the plurality of work voltages, the plurality of clock frequencies and a plurality of operations of a heat-dissipating device for the hardware device, and the adjustment further includes the step of:
   adjusting a current operation of the heat-dissipating device to one, corresponding to the obtained work level, of the plurality of operations of the heat-dissipating device for the hardware device recorded in the conversion table.

3. The efficiency optimization method of claim 2, wherein the heat-dissipating device is a fan, and each of the plurality of operations of the heat-dissipating device is a rotating speed of the fan.

4. The efficiency optimization method of claim 1, wherein when the obtained work level is higher than the current work level, the current work voltage and the current clock frequency are adjusted in order; and when the obtained work level is lower than the current work voltage, the current clock frequency and the current work voltage are adjusted in order.

5. The efficiency optimization method of claim 1 further comprising the step of:
   initializing the current work level with a initial current work level predetermined before the step of detecting a work current of the hardware device.

6. The efficiency optimization method of claim 5 further comprising the step of:
   updating the current work level in accordance with the obtained work level after executing the adjustment.

7. The efficiency optimization method of claim 1, wherein when the obtained work level differs from the current work level, further comprising the steps of:
   recording the obtained work level and starting to time a specific time; and
   during timing the specific time, repeating the steps of detecting, obtaining and comparing;
   wherein the adjustment is executed when the specific time is reached and the obtained work level maintains the same as the previously obtained work level.

8. The efficiency optimization method of claim 1 further comprising the step of:
   receiving a trigger signal to start the execution of the step of detecting a work current of the hardware device.

9. The efficiency optimization method of claim 1, wherein the hardware is one of a processor and a memory.

10. The efficiency optimization method of claim 2, wherein when the obtained work level is higher than the current work level, the current operation of the heat-dissipating device, the current work voltage and the current clock frequency are adjusted in order; and when the obtained work level is lower than the current work voltage, the current clock frequency, the current work voltage and the current operation of the heat-dissipating device are adjusted in order.

11. An efficiency optimization method for a hardware device with an adjustable clock frequency, comprising the steps of:
   providing at least a conversion table recording a plurality of correspondence relations among a plurality of work levels, a plurality of work currents, a plurality of work voltages, a plurality of clock frequencies;
   detecting a work current of a hardware device;
   obtaining a work level, corresponding to the detected work current, of the plurality of work levels recorded in the conversion table;
   comparing the obtained work level with a current work level;
   executing a first adjustment when the obtained work level is higher than the current work level, the first adjustment including the steps of:
      raising a current work voltage of the detected hardware device to one, corresponding to the work level higher one level than the current work level, of the plurality of work voltages recorded in the conversion table; and
      raising a current clock frequency of the detected hardware device to one, corresponding to the work level higher one level than the current work level, of the plurality of clock frequencies recorded in the conversion table; and
   executing a second adjustment when the obtained work level is lower than the current work level, the second adjustment including the steps of:
      lowering a current clock frequency of the detected hardware device to one, corresponding to the work level lower one level than the current work level, of the plurality of clock frequencies recorded in the conversion table; and
      lowering a current work voltage of the detected hardware device to one, corresponding to the work level higher one level than the current work level, of the plurality of work voltages recorded in the conversion table.

12. The efficiency optimization method of claim 11, wherein the at least a conversion table records the plurality of correspondence relations among the plurality of work levels, the plurality of work currents, the plurality of work voltages, the plurality of clock frequencies and a plurality of operations of a heat-dissipating device for the hardware device; wherein the first adjustment further includes the step of: adjusting a current operation of the heat-dissipating device for the detected hardware device to one, corresponding to the work level higher one level than the current work level, of the plurality of operations of the heat-dissipating device for the hardware device recorded in the conversion table; and wherein the second adjustment further includes the step of: adjusting a current operation of the heat-dissipating device for the detected hardware device to one, corresponding to the work level lower one level than the current work level, of the plurality of operations of the heat-dissipating device for the hardware device recorded in the conversion table.

13. The efficiency optimization method of claim 12, wherein the heat-dissipating device is a fan, and each of the plurality of operations of the heat-dissipating device is a rotating speed of the fan.

14. The efficiency optimization method of claim 11, wherein when the obtained work level is higher than the current work level, the current work voltage and the current clock frequency are adjusted in order; and when the obtained work level is lower than the current work voltage, the current clock frequency and the current work voltage are adjusted in order.

15. The efficiency optimization method of claim 11 further comprising the step of:
    initializing the current work level with a initial current work level predetermined before the step of detecting a work current of the hardware device.

16. The efficiency optimization method of claim 15, further comprising the step of:
    updating the current work level in accordance with the obtained work level after executing one of the first adjustment and the second adjustment.

17. The efficiency optimization method of claim 11, wherein when the obtained work level differs from the current work level, further comprising the steps of:
    recording the obtained work level and starting to time a specific time; and
    during timing of the specific time, repeating the steps of detecting, obtaining and comparing,
    wherein one of the first adjustment and the second adjustment is executed when the specific time is reached and the obtained work level maintains the same as the previously obtained work level; and
    wherein the execution of the first adjustment and the second adjustment is skipped when the obtained work level is not the same as the previously obtained work level during timing of the specific time.

18. The efficiency optimization method of claim 11 further comprising the step of:
    receiving a trigger signal to start the execution of the step of detecting a work current of the hardware device.

19. The efficiency optimization method of claim 11, wherein the hardware is one of a processor and a memory.

20. The efficiency optimization method of claim 12, wherein when the obtained work level is higher than the current work level, the current operation of the heat-dissipating device, the current work voltage and the current clock frequency are adjusted in order; and when the obtained work level is lower than the current work voltage, the current clock frequency, the current work voltage and the current operation of the heat-dissipating device are adjusted in order.

* * * * *